No. 684,492. Patented Oct. 15, 1901.
A. J. ADAMSON.
PROCESS OF SEPARATING THE CORE OR PITH FROM RIND OF FIBROUS MATERIAL.
(Application filed July 1, 1901.)
(No Model.)
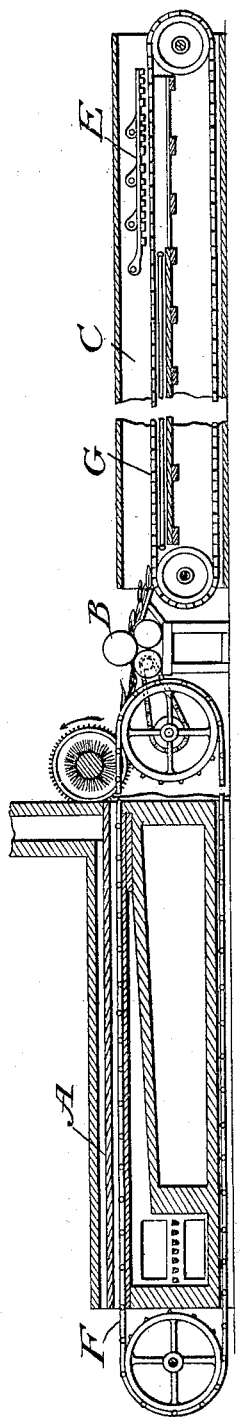
Witnesses:
Alex Scott
Geo. E. Garrett
Inventor.
Andrew J. Adamson
By Brown & Darby
Attorneys

UNITED STATES PATENT OFFICE.

ANDREW J. ADAMSON, OF CHICAGO, ILLINOIS, ASSIGNOR, BY DIRECT AND MESNE ASSIGNMENTS, OF FOUR-FIFTHS TO ERNEST B. DENISON, OF SAME PLACE.

PROCESS OF SEPARATING THE CORE OR PITH FROM RIND OF FIBROUS MATERIAL.

SPECIFICATION forming part of Letters Patent No. 684,492, dated October 15, 1901.

Application filed July 1, 1901. Serial No. 66,658. (No specimens.)

*To all whom it may concern:*

Be it known that I, ANDREW J. ADAMSON, a citizen of the United States, residing at Chicago, in the county of Cook and State of Illinois, have invented a new and useful Process of Separating the Core or Pith from the Rind in Fibrous Material, of which the following is a specification.

This invention relates to processes of separating the core or pith from the rind in fibrous material, such as sorghum or sugar-cane, cotton-stalks, cornstalks, ramie, cane, or other similar material.

The object of the invention is to separate the different portions of the material from each other in a simple and efficient manner, so that each may be utilized for the purposes for which it is intended or adapted.

The invention consists, substantially, in the mode of procedure as shown and set forth, and finally pointed out in the claims.

Green or other fibrous material—such as sorghum or sugar cane, cotton-stalks, cornstalks, ramie, cane, or the like—contain a pith or core which is specially valuable for making pulp in the manufacture of fine grades of paper or other suitable articles. Heretofore, so far as I am aware, no systematic effort has been made to effect a separation of this pith or core portion from the rind for the utilization thereof in the manufacture of paper. It is the special object of my invention to separate this pith or core from the rind portion and in such manner that the natural juices and the rind portion thereof may also be collected and utilized and the pith or core thereof produced in a condition particularly adapting it for use in making paper-pulp.

In carrying out my invention the material is first roasted or subjected to heat at about the temperature of boiling water, or in case of green fibrous material, such as sugar or sorghum cane, until the material becomes soft and the pith or core becomes loosened from the rind or outside portion and a gummy substance, containing the impurities and deleterious bacteria exudes therefrom and is burned off or evaporated. The material is subjected to the roasting or heating operation a sufficient length of time to effect this result, and I have found about ten minutes a sufficient length of time under proper conditions for the purpose. In this manner the impurities are eliminated with a portion of the natural juices of the material, the bacteria or other deleterious matter is destroyed, and the water content of such juices is evaporated to an extent of about fifty per cent., while at the same time the core or pith portion becomes loosened from the rind. After the material is roasted or heated, as above set forth, it is subjected to pressure or is crushed in order to squeeze out the remaining liquid portion or juices thereof. While being subjected to the pressure, the rind portion is crushed or broken up; but this step in my process does not injure the pith or core. Said pith or core being in a heated and softened condition is flattened and condensed into thin strips, and the pressure to which the material is subjected serves also to still further effect a detachment of the pith or core from the rind or outside cover portion. After being subjected to the pressure above noted the material is next thoroughly dried in order to evaporate and eliminate any remaining moisture or juices. During this reheating or drying operation the pith or core, which is of a spongy nature and which has been left by the pressing operation in the condition of thin flattened compressed strips, as above set forth, reëxpands, thereby aiding in sundering apart the crushed or split rind portion, thereby the more thoroughly effecting a separation of the pith or core from the rind, and while the material is being dried it is suitably agitated or beaten in order to break up and comminute or decorticate the rind-hull or outside cover portion to disrupt or break up any remaining ligaments or tissues which might otherwise cause adherence of the particles of rind and to effect a thorough separation of the pith or core therefrom, the pith or core remaining in long strips and not being broken up. The pith or core thus produced and separated is collected and forms an excellent material for making paper-pulp in the manufacture of fine grades of paper, drawing-paper, strawboard, or the like and is absolutely free from deleterious or other objectionable substances. The pith thus recovered may also be utilized for any other purpose for which it is adapted; but I have found the most valuable use therefor to be in the manufacture of paper-pulp. The rind portion decorticated from the core or pith is collected and bundled up and may be used or sold for fuel purposes, as I have found it highly inflammable and an excellent fuel. This rind portion may be utilized for producing the heat employed in the roasting step of my process and also for the drying operation, or it may be used for packing purposes as a substitute for excelsior or straw packing. In the case of sorghum or sugar cane the natural juices expressed from the material after the roasting operation may be collected and evaporated or otherwise treated in the ordinary manner to produce syrup, sugar, vinegar, or the like. This juice, obtained as described, is the pure natural juice of the cane free from impurities, and the syrup or sugar produced therefrom is purer and will not easily become sour and is devoid of the rank taste of the ordinary sorghum syrup or sugar and requires very much less time in the evaporation or manipulation thereof for conversion than would be the case if the material were not treated as above specified.

In the accompanying drawing I have illustrated one form of apparatus which I have found suitable for carrying out the process above described, the single view being a vertical central longitudinal section of the apparatus.

Referring to the drawing, reference-sign A designates a roasting-furnace in which the initial heating or roasting of the material is effected.

B designates pressing mechanism, such as rolls.

C designates a heating or drying chamber, and E suitable beaters or decorticating devices.

F is a conveyer by which the material is carried through the roasting-furnace and delivered to the compressing mechanism, and G is a conveyer by which the material is carried through the heating or drying chamber and past the beaters.

My invention, however, does not reside in the apparatus employed, and therefore the construction illustrated is merely one form adapted to the practical carrying out of my process.

Having now set forth the object and nature of my invention and the manner of carrying the same into practical operation, what I claim as new and useful and of my own invention, and desire to secure by Letters Patent, is—

1. The process which consists in roasting or heating fibrous or other material such as cane, sugar or sorghum cane, cornstalks, cotton-stalks, ramie or the like, then subjecting the same to pressure to expel the natural juices remaining after being roasted or heated, then drying the mass and finally separating the pith or core from the rind portion whereby the pith or core is obtained in condition for use, as and for the purpose set forth.

2. The process which consists in roasting sorghum or other cane, cornstalks, ramie, cotton-stalks or the like, then expressing the juices therefrom, then heating or drying the residue, and finally decorticating the rind portion whereby the pith or core is separated and recovered therefrom, as and for the purpose set forth.

3. The method of separating the pith or core portion from fibrous material which consists in roasting said material, then subjecting the same to pressure to crush the same, then drying the same, and finally beating the dried material whereby the pith or core is separated and recovered therefrom, as and for the purpose set forth.

In witness whereof I have hereunto set my hand this 27th day of June, 1901, in the presence of the subscribing witnesses.

ANDREW J. ADAMSON.

Witnesses:
E. C. SEMPLE,
C. H. SEEM.